US012542385B2

(12) United States Patent
Yao

(10) Patent No.: US 12,542,385 B2
(45) Date of Patent: Feb. 3, 2026

(54) POWER CONNECTOR WITH IMPROVED CURRENT-CARRYING CAPABILITY

(71) Applicant: DONGGUAN LUXSHARE TECHNOLOGIES CO., LTD, Dongguan (CN)

(72) Inventor: Kunlin Yao, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 377 days.

(21) Appl. No.: 18/237,636

(22) Filed: Aug. 24, 2023

(65) Prior Publication Data

US 2025/0038447 A1 Jan. 30, 2025

(30) Foreign Application Priority Data

Jul. 26, 2023 (CN) ......................... 202310923683.7

(51) Int. Cl.
*H01R 12/70* (2011.01)
*H01R 13/11* (2006.01)
(Continued)

(52) U.S. Cl.
CPC ....... *H01R 12/7088* (2013.01); *H01R 13/113* (2013.01); *H01R 13/2457* (2013.01);
(Continued)

(58) Field of Classification Search
CPC H01R 12/7088; H01R 12/721; H01R 12/722; H01R 12/57; H01R 13/113; H01R 13/2492; H01R 13/2457
(Continued)

(56) References Cited

U.S. PATENT DOCUMENTS

RE39,380 E * 11/2006 Davis ..................... H01R 13/26
439/108
9,800,004 B1 * 10/2017 Schepis .................. H01R 4/305
(Continued)

FOREIGN PATENT DOCUMENTS

CN 105990730 B 7/2018
CN 212277462 U 1/2021
(Continued)

*Primary Examiner* — Marcus E Harcum

(74) *Attorney, Agent, or Firm* — Birch, Stewart, Kolasch & Birch, LLP

(57) ABSTRACT

A power connector includes an insulating body, a first power terminal, a second power terminal and a third power terminal. The first power terminal includes a first fixing portion and a first elastic arm. The second power terminal includes a second fixing portion and a second elastic arm. The third power terminal includes a third fixing portion sandwiched between the first fixing portion and the second fixing portion, a first supplementary elastic arm extending from the third fixing portion, and a second supplementary elastic arm extending from the third fixing portion. The first supplementary elastic arm is extended to be arranged side by side with the first elastic arm. The second supplementary elastic arm is extended to be arranged side by side with the second elastic arm. As a result, the current-carrying area in contact with a mating power connector is increased, which improves the current transmission capability.

20 Claims, 10 Drawing Sheets

(51) Int. Cl.
*H01R 13/24* (2006.01)
*H01R 12/72* (2011.01)

(52) U.S. Cl.
CPC ....... *H01R 13/2492* (2013.01); *H01R 12/721* (2013.01); *H01R 12/724* (2013.01)

(58) Field of Classification Search
USPC .................................................. 439/660, 856
See application file for complete search history.

(56) References Cited

U.S. PATENT DOCUMENTS

| | | | | |
|---|---|---|---|---|
| 9,960,514 | B1 * | 5/2018 | Chen | H01R 24/68 |
| 11,545,775 | B2 | 1/2023 | Liu et al. | |
| 2004/0147177 | A1 * | 7/2004 | Wagner | H01R 13/113 439/855 |
| 2006/0003620 | A1 * | 1/2006 | Daily | H01R 13/514 439/295 |
| 2009/0142953 | A1 * | 6/2009 | Patel | H01R 12/7088 439/345 |
| 2010/0048056 | A1 * | 2/2010 | Daily | H01R 12/73 439/485 |
| 2012/0295489 | A1 * | 11/2012 | Uozumi | H01R 13/17 439/660 |
| 2015/0038000 | A1 * | 2/2015 | Glick | H01R 13/113 439/370 |
| 2016/0233635 | A1 | 8/2016 | Chen | |
| 2017/0373419 | A1 * | 12/2017 | Lee | H01R 12/724 |
| 2019/0020142 | A1 * | 1/2019 | Cheng | H01R 13/46 |
| 2020/0274268 | A1 * | 8/2020 | Hung | H01R 13/502 |
| 2021/0091514 | A1 * | 3/2021 | Wu | H01R 13/115 |
| 2021/0305732 | A1 * | 9/2021 | Chen | H01R 12/75 |
| 2021/0313717 | A1 * | 10/2021 | Hung | H01R 13/11 |
| 2021/0408734 | A1 * | 12/2021 | Hung | H01R 12/585 |
| 2022/0094122 | A1 * | 3/2022 | Liu | H01R 25/142 |
| 2022/0131300 | A1 * | 4/2022 | Liu | H01R 4/489 |
| 2022/0224032 | A1 * | 7/2022 | Chen | H01R 12/737 |
| 2022/0263282 | A1 * | 8/2022 | Liu | H01R 13/113 |
| 2024/0079810 | A1 * | 3/2024 | Carbaugh | H01R 13/113 |
| 2024/0088591 | A1 * | 3/2024 | Liu | H01R 13/111 |
| 2024/0145999 | A1 * | 5/2024 | Huang | H01R 13/6585 |

FOREIGN PATENT DOCUMENTS

| | | | |
|---|---|---|---|
| CN | 212392405 | U | 1/2021 |
| CN | 218975838 | U | 5/2023 |
| EP | 2 494 660 | B1 | 2/2020 |
| TW | M604063 | U | 11/2020 |
| TW | M608784 | U | 3/2021 |

* cited by examiner

POWER CONNECTOR WITH IMPROVED CURRENT-CARRYING CAPABILITY

CROSS-REFERENCE TO RELATED APPLICATION

This patent application claims priority of a Chinese Patent Application No. 202310923683.7, filed on Jul. 26, 2023 and titled "POWER CONNECTOR", the entire content of which is incorporated herein by reference.

TECHNICAL FIELD

The present disclosure relates to a power connector, which belongs to a technical field of connectors.

BACKGROUND

A power connector in the related art generally includes an insulating body and a plurality of power terminals. The plurality of power terminals generally includes a first power terminal and a second power terminal. The first power terminal includes a first fixing portion and a plurality of first elastic arms disposed at intervals. The second power terminal includes a second fixing portion and a plurality of second elastic arms disposed at intervals. The first elastic arm includes a first contact surface. The second elastic arm includes a second contact surface. The first contact surface and the second contact surface are located on a same row.

In the related art, a space between each two adjacent first elastic arms and a space between each two adjacent second elastic arms are not fully utilized, so that the current-carrying capability of the power terminals is limited. With the continuous improvement of power transmission requirements, higher requirements are placed on the power transmission capability of the power terminals, and there is still room for improvement in the power terminals in the related art.

SUMMARY

An Object of the Present Disclosure is to Provide a Power Connector with Improved Current-Carrying Capability.

In order to achieve the above object, the present disclosure adopts the following technical solution: a power connector, including: an insulating body including a mating surface and a mating slot extending through the mating surface along a first direction; the mating slot being configured to at least partially receive a mating power connector; and a plurality of power terminals including a first power terminal, a second power terminal and a third power terminal; wherein the first power terminal includes a first fixing portion fixed to the insulating body and at least one first elastic arm extending from the first fixing portion; the first elastic arm includes a first contact surface; the second power terminal includes a second fixing portion fixed to the insulating body and at least one second elastic arm extending from the second fixing portion; the second elastic arm includes a second contact surface; the third power terminal includes a third fixing portion sandwiched between the first fixing portion and the second fixing portion, at least one first supplementary elastic arm extending from the third fixing portion, and at least one second supplementary elastic arm extending from the third fixing portion; the first supplementary elastic arm includes a first supplementary contact surface; the second supplementary elastic arm includes a second supplementary contact surface; a length of the first elastic arm along the first direction is different from a length of the second elastic arm along the first direction, so that the first contact surface and the second contact surface are disposed at intervals along the first direction; a length of the first supplementary elastic arm along the first direction is different from a length of the second supplementary elastic arm along the first direction, so that the first supplementary contact surface and the second supplementary contact surface are disposed at intervals along the first direction; the first supplementary elastic arm is such extended to be disposed side by side with the first elastic arm along a second direction, so that the first contact surface and the first supplementary contact surface are located in a first row; the second direction is perpendicular to the first direction; the second supplementary elastic arm is such extended to be arranged side by side with the second elastic arm along the second direction, so that the second contact surface and the second supplementary contact surface are located in a second row; the first row and the second row are parallel to each other.

In order to achieve the above object, the present disclosure adopts the following technical solution: a power connector, including: an insulating body including a mating surface and a mating slot extending through the mating surface along a first direction; the mating slot being configured to at least partially receive a mating power connector; and a plurality of power terminals including a first power terminal, a second power terminal and a third power terminal; wherein the first power terminal includes a first fixing portion and at least one first elastic arm extending from the first fixing portion; the first elastic arm includes a first contact surface; the second power terminal includes a second fixing portion and at least one second elastic arm extending from the second fixing portion; the second elastic arm includes a second contact surface; the third power terminal includes a third fixing portion sandwiched between the first fixing portion and the second fixing portion, a first supplementary elastic arm integrally extending from the third fixing portion, and a second supplementary elastic arm integrally extending from the third fixing portion; the first supplementary elastic arm includes a first supplementary contact surface; the second supplementary elastic arm includes a second supplementary contact surface; the first contact surface and the second contact surface are disposed at intervals along the first direction; the first supplementary contact surface and the second supplementary contact surface are disposed at intervals along the first direction; the first supplementary elastic arm is such extended to be disposed side by side with the first elastic arm along a second direction, so that the first contact surface and the first supplementary contact surface are located in a first row; the second direction is perpendicular to the first direction; the second supplementary elastic arm is such extended to be arranged side by side with the second elastic arm along the second direction, so that the second contact surface and the second supplementary contact surface are located in a second row; the first row and the second row are parallel to each other.

Compared with the prior art, the plurality of power terminals in the present disclosure include the third power terminal. The third power terminal includes the first supplementary elastic arm arranged side by side with the first elastic arm and the second supplementary elastic arm arranged side by side with the second elastic arm, thereby increasing the current-carrying area in contact with the mating power connector. As a result, the power terminals of the present disclosure have a higher current transmission capability, and reduce the heat generated by the power terminals when transmitting a large current.

DETAILED DESCRIPTION

Figure 1:
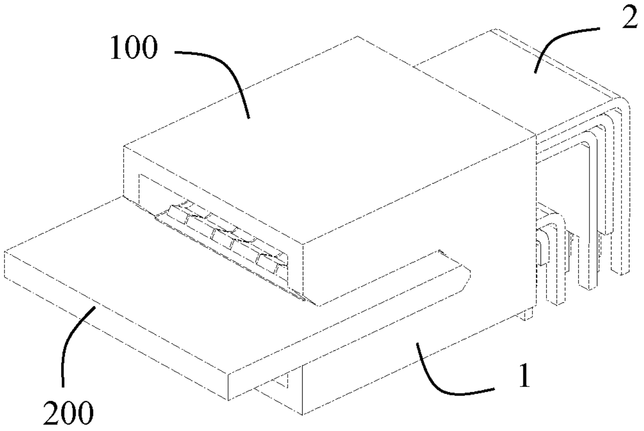
FIG. 1 is a perspective schematic view of a power connector in mating with a mating power connector in accordance with an embodiment of the present disclosure.
Figure 2:
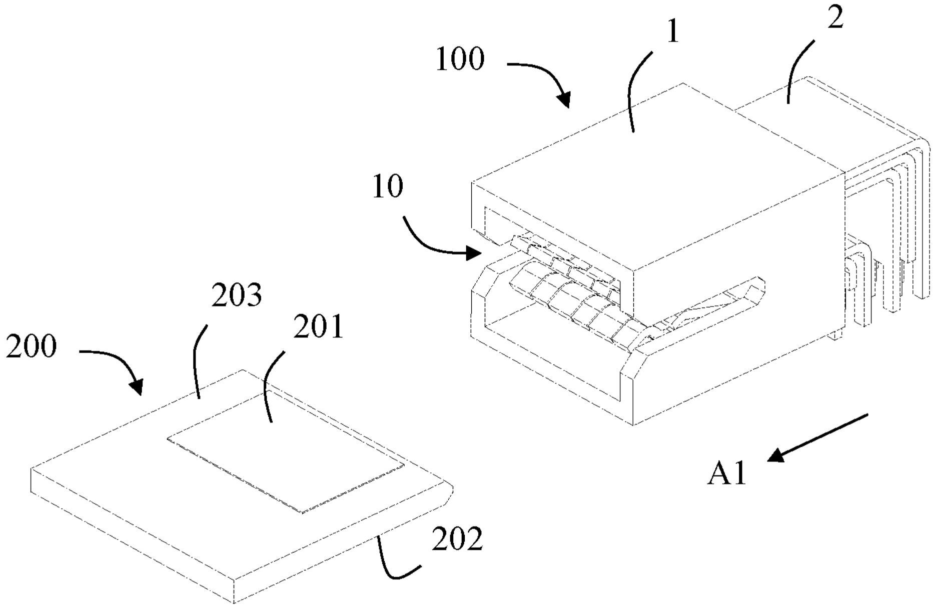
FIG. 2 is a partial perspective exploded view of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 11, the present disclosure discloses a power connector 100 for mating with a mating power connector 200. The power connector 100 includes an insulating body 1 and a plurality of power terminals 2. In the illustrated embodiment of the present disclosure, the plurality of power terminals 2 include a first group of power terminals 2*a* and a second group of power terminals 2*b*. The mating power connector 200 includes a first surface 203 (such as an upper surface), a second surface 204 (such as a lower surface) opposite to the first surface 203, a first contact pad 201 exposed on the first surface 203, and a second contact pad (not shown) exposed on the second surface 204.

Referring to FIG. 1 to FIG. 4, the insulating body 1 includes a mating surface 11, a mounting surface 12, and a mating slot 10 extending through the mating surface 11 along a first direction A1 (for example, a rear-to-front direction). The mating slot 10 is configured to at least partially receive the mating power connector 200. The mounting surface 12 is configured for mounting the power connector 100 to a circuit board (not shown).

The insulating body 1 includes a top wall 13 and a bottom wall 14. The mating slot 10 is located between the top wall 13 and the bottom wall 14. The insulating body 1 further includes a plurality of first partition walls 131 protruding from a lower surface of the top wall 13 toward the mating slot 10. Two adjacent first partition walls 131 and the top wall 13 jointly form a U-shaped first receiving groove 132. Similarly, the insulating body 1 further includes a plurality of second partition walls 141 protruding from an upper surface of the bottom wall 14 toward the mating slot 10. Two adjacent second partition walls 141 and the bottom wall 14 jointly form a U-shaped second receiving groove 142. In the illustrated embodiment of the present disclosure, the first receiving groove 132 and the second receiving groove 142 at corresponding positions are aligned in a vertical direction.

Referring to FIG. 3 to FIG. 11, in the embodiment illustrated in the present disclosure, the first group of power terminals 2*a* includes a first power terminal 21, a second power terminal 22 and a third power terminal 23. The second group of power terminals 2*b* includes a fourth power terminal 24, a fifth power terminal 25 and a sixth power terminal 26.

Referring to FIG. 5 to FIG. 8, in the embodiment shown in the present disclosure, the first power terminal 21 includes a first fixing portion 211 fixed to the insulating body 1, at least one first elastic arm 212 extending from one end of the first fixing portion 211, and a first mounting leg 213 bent downwardly from the other end of the first fixing portion 211. In the illustrated embodiment of the present disclosure, a plurality of first elastic arms 212 are provided and disposed at intervals along a second direction A2-A2 (for example, a left-right direction). The second direction A2-A2 is perpendicular to the first direction A1. The first power terminal 21 further includes a plurality of first spacing slots 210 of which each is located between two adjacent first elastic arms 212.

The first elastic arm 212 includes a first elastic portion 2121 connected to the first fixing portion 211 and a first contact portion 2122 bent from the first elastic portion 2121. The first elastic portion 2121 extends along the first direction A1. The first contact portion 2122 includes a first bent portion 2122*a*, a second bent portion 2122*b*, and a first end portion 2122*c* connected to the second bent portion 2122*b*. In the illustrated embodiment of the present disclosure, the first bent portion 2122*a* and the second bent portion 2122*b* are connected to form a substantially S-shaped configuration.

Specifically, in the illustrated embodiment of the present disclosure, the first bent portion 2122*a* extends forwardly and downwardly from the first elastic base portion 2121. The second bent portion 2122*b* extends downwardly and forwardly from the first bent portion 2122*a*. The first end portion 2122*c* extends forwardly and upwardly from the second bent portion 2122*b*. A first contact surface 214 is formed on a bottom surface of the second bent portion 2122*b* for contacting with the first contact pad 201 of the mating power connector 200.

The second power terminal 22 includes a second fixing portion 221 fixed to the insulating body 1, a second elastic arm 222 extending from one end of the second fixing portion 221, and a second mounting leg 223 bent downwardly from the other end of the second fixing portion 221. In the illustrated embodiment of the present disclosure, a plurality of second elastic arms 222 are provided and disposed at intervals along the second direction A2-A2. The second power terminal 22 further includes a plurality of second spacing slots 220 of which each is located between two adjacent second elastic arms 222.

The second elastic arm 222 includes a second elastic portion 2221 connected to the second fixing portion 221 and a second contact portion 2222 bent from the second elastic base portion 2221. The second elastic portion 2221 extends downwardly and forwardly from the second fixing portion 221. The second contact portion 2222 is substantially V-shaped. A second contact surface 224A is formed on a bottom surface of the second contact portion 2222 for contacting with the first contact pad 201 of the mating power connector 200. The second contact portion 2222 further has a second end portion 2222*c*.

The third power terminal 23 includes a third fixing portion 231 sandwiched between the first fixing portion 211 and the second fixing portion 221, at least one first supplementary elastic arm 235 integrally extending from the third fixing portion 231, at least one second supplementary elastic arm 236 integrally extending from the third fixing portion 231, and a third mounting leg 233 bent downwardly from the third fixing portion 231. In the illustrated embodiment of the present disclosure, a plurality of first supplementary elastic arms 235 are provided and disposed at intervals along the second direction A2-A2. A plurality of second supplementary elastic arms 236 are provided and disposed at intervals along the second direction A2-A2. The plurality of the first supplementary elastic arms 235 and the plurality of the second supplementary elastic arms 236 are alternately arranged along the second direction A2-A2.

The first supplementary elastic arm 235 includes a first supplementary elastic base portion 2351 connected to the third fixing portion 231 and a first supplementary contact portion 2352 bent from the first supplementary elastic base portion 2351. The first supplementary elastic portion 2351 extends along the first direction A1. The first supplementary contact portion 2352 includes a first supplementary bent portion 2352*a*, a second supplementary bent portion 2352*b*, and a first supplementary end portion 2352*c* connected to the second supplementary bent portion 2352*b*. In the illustrated embodiment of the present disclosure, the first supplementary bent portion 2352*a* and the second supplementary bent portion 2352*b* are connected in a substantially S-shaped configuration.

Specifically, in the illustrated embodiment of the present disclosure, the first supplementary bent portion 2352*a* extends forwardly and downwardly from the first supplementary elastic base portion 2351. The second supplementary bent portion 2352*b* extends downwardly and forwardly from the first supplementary bent portion 2352*a*. The first supplementary end portion 2352*c* extends forwardly and upwardly from the second supplementary bent portion 2352*b*. A first supplementary contact surface 235*a* is formed on a bottom surface of the second supplementary bent portion 2352*b* for contacting with the first contact pad 201 of the mating power connector 200.

The second supplementary elastic arm 236 includes a second supplementary elastic base portion 2361 connected to the third fixing portion 231 and a second supplementary contact portion 2362 bent from the second supplementary elastic base portion 2361. The second supplementary elastic base portion 2361 extends downwardly and forwardly from the third fixing portion 231. The second supplementary contact portion 2362 is roughly V-shaped. A second supplementary contact surface 236*a* is formed on a bottom surface of the second supplementary contact portion 2362 for contacting with the first contact pad 201 of the mating power connector 200. The second supplementary contact portion 2362 further includes a second supplementary end portion 2362*c*.

In the embodiment shown in the present disclosure, a length of the first elastic arm 212 along the first direction A1 is different from a length of the second elastic arm 222 along the first direction A1, so that the first contact surface 214 and the second contact surface 224 are disposed at intervals along the first direction A1. A length of the first supplementary elastic arm 235 along the first direction A1 is different from a length of the second supplementary elastic arm 236 along the first direction A1, so that the first supplementary contact surface 235*a* and the second supplementary contact surface 236*a* are disposed at intervals along the first direction A1.

Figure 3:
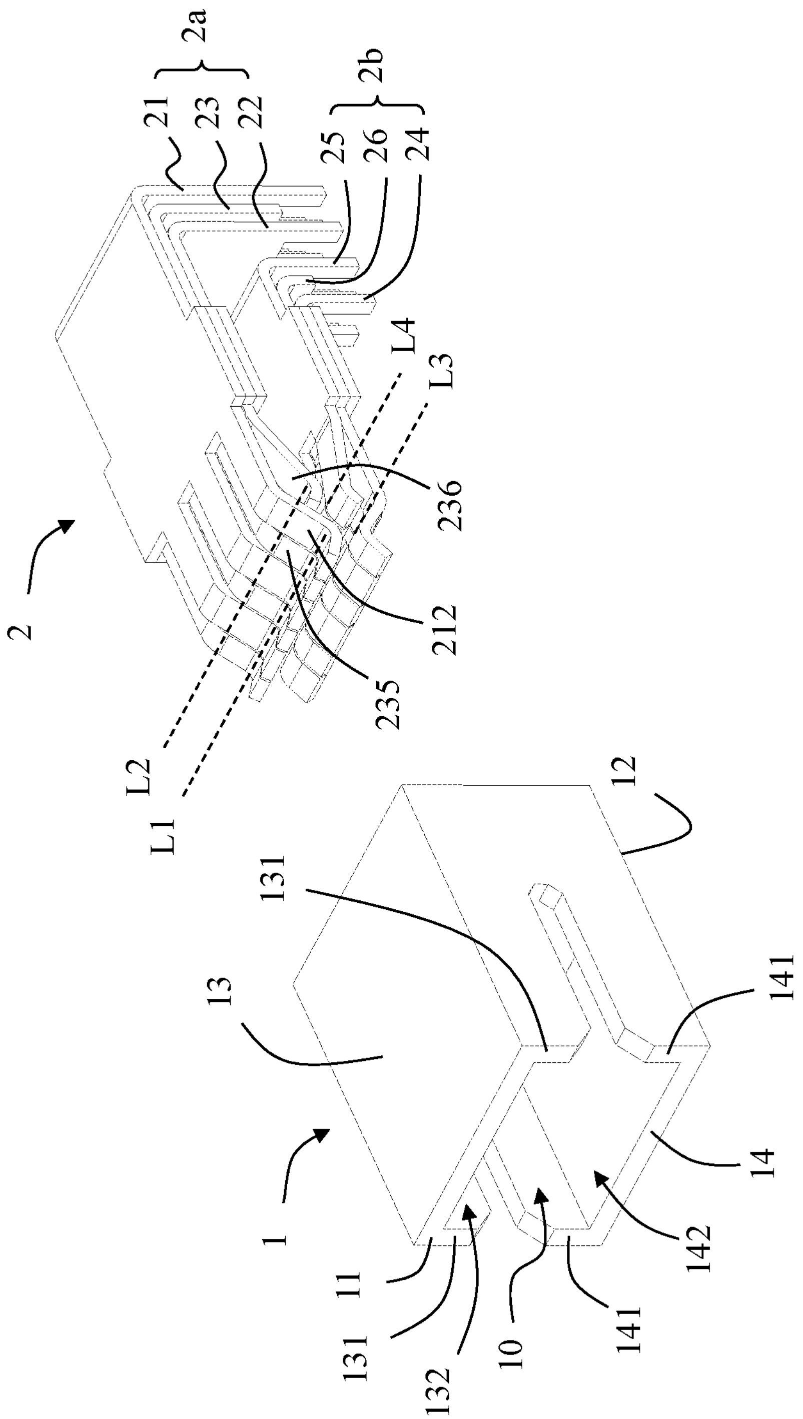
FIG. 3 is a partial perspective exploded view of the power connector in FIG. 2.
Figure 4:
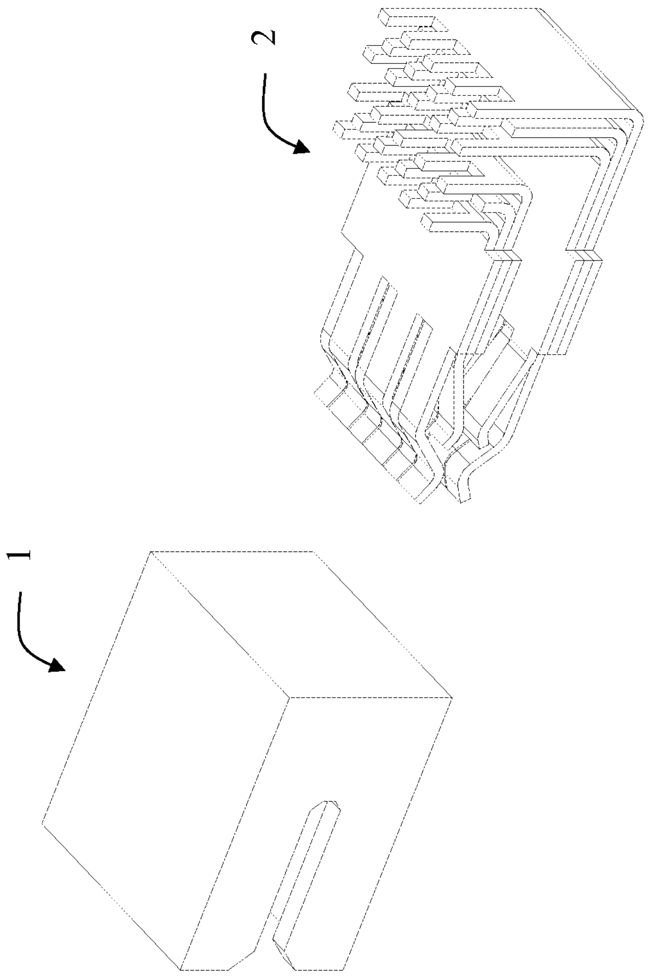
FIG. 4 is a partial perspective exploded view of FIG. 3 from another angle.

As shown in FIG. 3, the first supplementary elastic arm 235 is such extended to be arranged side by side with the first elastic arm 212 along the second direction A2-A2, so that the first contact surface 214 and the first supplementary contact surface 235*a* are located in a first row L1. The second supplementary elastic arm 236 is such extended to be arranged side by side with the second elastic arm 222 along the second direction A2-A2, so that the second contact surface 224 and the second supplementary contact surface 236*a* are located at a second row L2. The first row L1 and the second row L2 are parallel to each other. The first contact surface 214, the first supplementary contact surface 235*a*, the second contact surface 224 and the second supplementary contact surface 236*a* are flush (that is, located in a same plane), to contact with the first contact pad 201 of the mating power connector 200.

Specifically, the first fixing portion 211, the third fixing portion 231 and the second fixing portion 221 are disposed in sequence along the vertical direction and connected together. The first supplementary elastic arms 235 are extended into the first spacing slots 210, and the second supplementary elastic arms 236 are extended into the second spacing slots 220.

In the illustrated embodiment of the present disclosure, the number of the first elastic arms 212, the number of the second elastic arms 222, the number of the first supplementary elastic arms 235 and the number of the second supplementary elastic arms 236 are the same (for example, three).

A width of each of the first elastic arms 212 along the second direction A2-A2 is greater than a width of each of the first supplementary elastic arms 235 along the second direction A2 -A2. A width of each of the second elastic arms 222 along the second direction A2-A2 is greater than a width of each of the second supplementary elastic arms 236 along the second direction A2 -A2.

In the illustrated embodiment of the present disclosure, the power connector 100 includes a first space 2122*d* located behind the first bent portion 2122*a* and the second bent portion 2122*b*, and a second space 2352*d* located behind the first supplementary bent portion 2352*a* and the second supplementary bent portion 2352*b*. The second supplementary end portion 2362*c* at least partially extends into the first space 2122*d*, and the second end portion 2222*c* at least partially extends into the second space 2352*d*, so as to reduce the risk of the second end portion 2222*c* and the second supplementary end portion 2362*c* being damaged by the mating power connector 200 when it is inserted into the mating slot 10.

Figure 9:
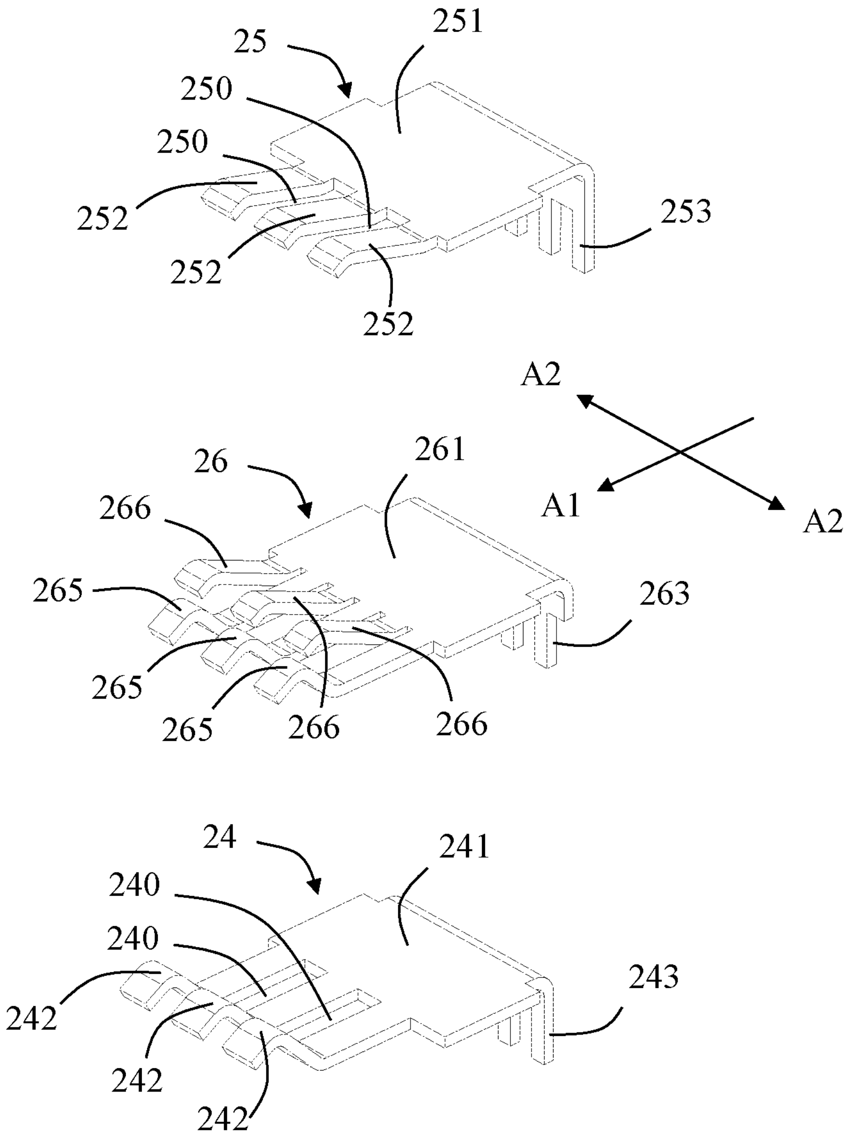
FIG. 9 is a perspective exploded view of a second group of power terminals in FIG. 3.
Figure 10:
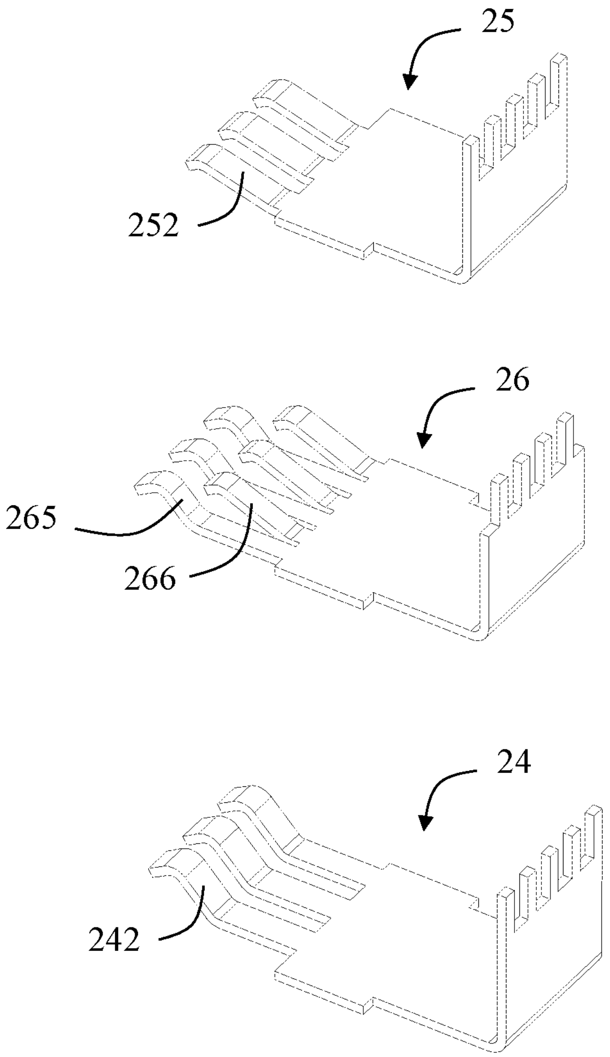
FIG. 10 is an exploded perspective view of FIG. 9 from another angle.
Figure 11:
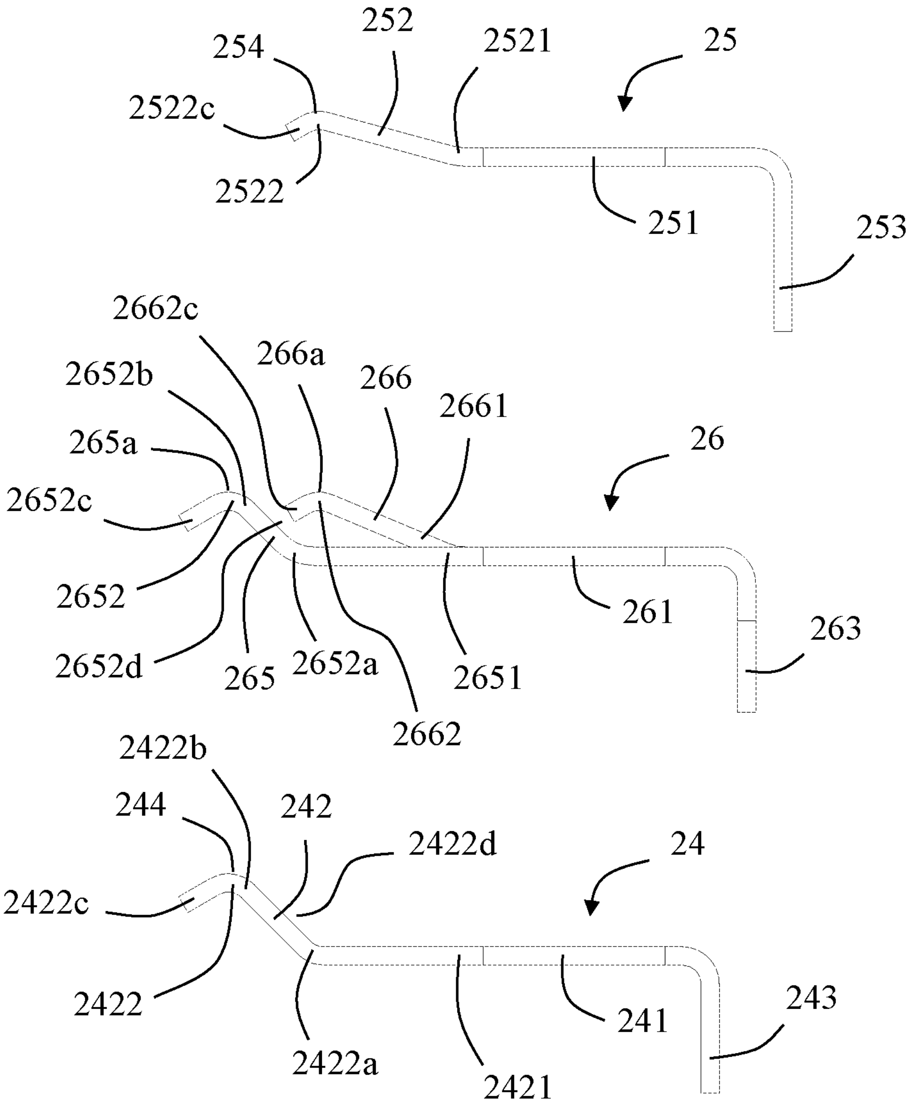
FIG. 11 is a right side view of FIG. 9.

Referring to FIG. 9 to FIG. 11, similarly, the fourth power terminal 24 includes a fourth fixing portion 241 fixed to the insulating body 1, at least one fourth elastic arm 242 extending from one end of the fourth fixing portion 241, and a fourth mounting leg 243 bent downwardly from the other end of the fourth fixing portion 241. In the illustrated embodiment of the present disclosure, a plurality of fourth elastic arms 242 are provided and disposed at intervals along the second direction A2-A2. The fourth power terminal 24 further includes a plurality of fourth spacing slots 240 of which each is located between two adjacent fourth elastic arms 242.

The fourth elastic arm 242 includes a fourth elastic portion 2421 connected to the fourth fixing portion 241 and a fourth contact portion 2422 bent from the fourth elastic portion 2421. The fourth elastic portion 2421 extends along the first direction A1. The fourth contact portion 2422 includes a third bent portion 2422*a*, a fourth bent portion 2422*b*, and a fourth end portion 2422*c* connected to the fourth bent portion 2422*b*. In the illustrated embodiment of the present disclosure, the third bent portion 2422*a* and the fourth bent portion 2422*b* are connected to form a substantially S-shaped configuration.

Specifically, in the illustrated embodiment of the present disclosure, the third bent portion 2422*a* extends forwardly and upwardly from the fourth elastic base portion 2421. The fourth bent portion 2422*b* extends upwardly and forwardly from the third bent portion 2422*a*. The fourth end portion 2422*c* extends forwardly and downwardly from the fourth bent portion 2422*b*. A fourth contact surface 244 is formed on a top surface of the fourth bent portion 2422*b* for contacting with the second contact pad of the mating power connector 200.

The fifth power terminal 25 includes a fifth fixing portion 251 fixed to the insulating body 1, a fifth elastic arm 252 extending from one end of the fifth fixing portion 251, and a fifth mounting leg 253 bent downwardly from the other end of the fifth fixing portion 251. In the illustrated embodiment of the present disclosure, a plurality of fifth elastic arms 252 are provided and disposed at intervals along the second direction A2-A2. The fifth power terminal 25 further includes a plurality of fifth spacing slots 250 of which each is located between two adjacent fifth elastic arms 252.

The fifth elastic arm 252 includes a fifth elastic portion 2521 connected to the fifth fixing portion 251 and a fifth contact portion 2522 bent from the fifth elastic base portion 2521. The fifth elastic base portion 2521 extends downwardly and forwardly from the fifth fixing portion 251. The fifth contact portion 2522 is roughly V-shaped. A fifth contact surface 254 is formed on a top surface of the fifth contact portion 2522 for contacting with the second contact pad of the mating power connector 200. The fifth contact portion 2522 further has a fifth end portion 2522*c*.

The sixth power terminal 26 includes a sixth fixing portion 261 sandwiched between the fourth fixing portion 241 and the fifth fixing portion 251, at least one fourth supplementary elastic arm 265 integrally extending from the sixth fixing portion 261, at least one fifth supplementary elastic arm 266 integrally extending from the sixth fixing portion 261, and a sixth mounting leg 263 bent downwardly from the sixth fixing portion 261. In the illustrated embodiment of the present disclosure, a plurality of fourth supplementary elastic arms 265 are provided and disposed at intervals along the second direction A2-A2. A plurality of fifth supplementary elastic arms 266 are provided and disposed at intervals along the second direction A2-A2. The plurality of fourth supplementary elastic arms 265 and the plurality of fifth supplementary elastic arms 266 are alternately disposed along the second direction A2-A2.

The fourth supplementary elastic arm 265 includes a fourth supplementary elastic base portion 2651 connected to the sixth fixing portion 261 and a fourth supplementary contact portion 2652 bent from the fourth supplementary elastic base portion 2651. The fourth supplementary elastic portion 2651 extends along the first direction A1. The fourth supplementary contact portion 2652 includes a third supplementary bent portion 2652*a*, a fourth supplementary bent portion 2652*b*, and a third supplementary end portion 2652*c* connected to the fourth supplementary bent portion 2652*b*. In the illustrated embodiment of the present disclosure, the third supplementary bent portion 2652*a* and the fourth supplementary bent portion 2652*b* are connected in a substantially S-shaped configuration.

Specifically, in the illustrated embodiment of the present disclosure, the third supplementary bent portion 2652*a* extends forwardly and upwardly from the fourth supplementary elastic base portion 2651. The fourth supplementary bent portion 2652*b* extends upwardly and forwardly from the third supplementary bent portion 2652*a*. The third supplementary end portion 2652*c* extends forwardly and downwardly from the fourth supplementary bent portion 2652*b*. A fourth supplementary contact surface 265*a* is formed on a top surface of the fourth supplementary bent portion 2652*b* for contacting with the second contact pad of the mating power connector 200.

The fifth supplementary elastic arm 266 includes a fifth supplementary elastic base portion 2661 connected to the sixth fixing portion 261 and a fifth supplementary contact portion 2662 bent from the fifth supplementary elastic base portion 2661. The fifth supplementary elastic base portion 2661 extends downwardly and forwardly from the sixth fixing portion 261. The fifth supplementary contact portion 2662 is roughly V-shaped. A fifth supplementary contact surface 266*a* is formed on a top surface of the fifth supplementary contact portion 2662 for contacting with the second contact pad of the mating power connector 200. The fifth supplementary contact portion 2662 further includes a fourth supplementary end portion 2662*c*.

In the embodiment shown in the present disclosure, a length of the fourth elastic arm 242 along the first direction A1 is different from a length of the fifth elastic arm 252 along the first direction A1, so that the fourth contact surface 244 and the fifth contact surface 254 are disposed at intervals along the first direction A1. A length of the fourth supplementary elastic arm 265 along the first direction A1 is different from a length of the fifth supplementary elastic arm 266 along the first direction A1, so that the fourth supplementary contact surface 265*a* and the fifth supplementary contact surface 266*a* are disposed at intervals along the first direction A1.

As shown in FIG. 3, the fourth supplementary elastic arm 265 is such extended to be arranged side by side with the fourth elastic arm 242 along the second direction A2-A2, so that the fourth contact surface 244 and the fourth supplementary contact surface 265*a* are located in a third row L3. The fifth supplementary elastic arm 266 is such extended to be arranged side by side with the fifth elastic arm 252 along the second direction A2-A2, so that the fifth contact surface 254 and the fifth supplementary contact surface 266*a* are located at a fourth row L4. The third row L3 and the fourth row L4 are parallel to each other. The fourth contact surface 244, the fourth supplementary contact surface 265*a*, the fifth contact surface 254, and the fifth supplementary contact surface 266*a* are flush (that is, located in a same plane), to contact the second contact pad of the mating power connector 200.

Specifically, the fifth fixing portion 251, the sixth fixing portion 261 and the fourth fixing portion 241 are disposed in sequence along the vertical direction and connected together. The fourth supplementary elastic arms 265 are extended into the fourth spacing slots 240. The fifth supplementary elastic arms 266 are extended into the fifth spacing slots 250.

In the illustrated embodiment of the present disclosure, the number of the fourth elastic arms 242, the number of the fifth elastic arms 252, the number of the fourth supplementary elastic arms 265 and the number of the fifth supplementary elastic arms 266 are the same (for example, three).

A width of each of the fourth elastic arms 242 along the second direction A2-A2 is greater than a width of each of the fourth supplementary elastic arms 265 along the second direction A2-A2. A width of each of the fifth elastic arms 252 along the second direction A2-A2 is greater than a width of each of the fifth supplementary elastic arms 266 along the second direction A2-A2.

In the illustrated embodiment of the present disclosure, the power connector 100 includes a third space 2422*d* located behind the third bent portion 2422*a* and the fourth bent portion 2422*b*, and a fourth space 2652*d* located behind the third supplementary bent portion 2652*a* and the fourth supplementary bent portion 2652*b*. The fourth supplementary end portion 2662*c* at least partially extends into the third space 2422*d*, and the fifth end portion 2522*c* at least partly extends into the fourth space 2652*d*, so as to reduce the risk of the fifth end portion 2522*c* and the fourth supplementary end portion 2662*c* being damaged by the mating power connector 200.

In the illustrated embodiment of the present disclosure, the first contact surface 214, the first supplementary contact surface 235*a*, the second contact surface 224 and the second supplementary contact surface 236*a* are located on one side (for example, an upper side) of the mating slot 10. The fourth contact surface 244, the fourth supplementary contact surface 265*a*, the fifth contact surface 254 and the fifth supplementary contact surface 266*a* are located on the other side (for example, a lower side) of the mating slot 10.

In the illustrated embodiment of the present disclosure, the first elastic arm 212 and the fourth elastic arm 242 are symmetrically disposed on two sides (for example, upper and lower sides) of the mating slot 10. The second elastic arm 222 and the fifth elastic arm 252 are symmetrically disposed on the two sides (for example, the upper and lower sides) of the mating slot 10. The first supplementary elastic arm 235 and the fourth supplementary elastic arm 265 are symmetrically disposed on the two sides (for example, the upper and lower sides) of the mating slot 10. The second supplementary elastic arm 236 and the fifth supplementary elastic arm 266 are symmetrically disposed on the two sides (for example, the upper and lower sides) of the mating slot 10.

Figure 5:
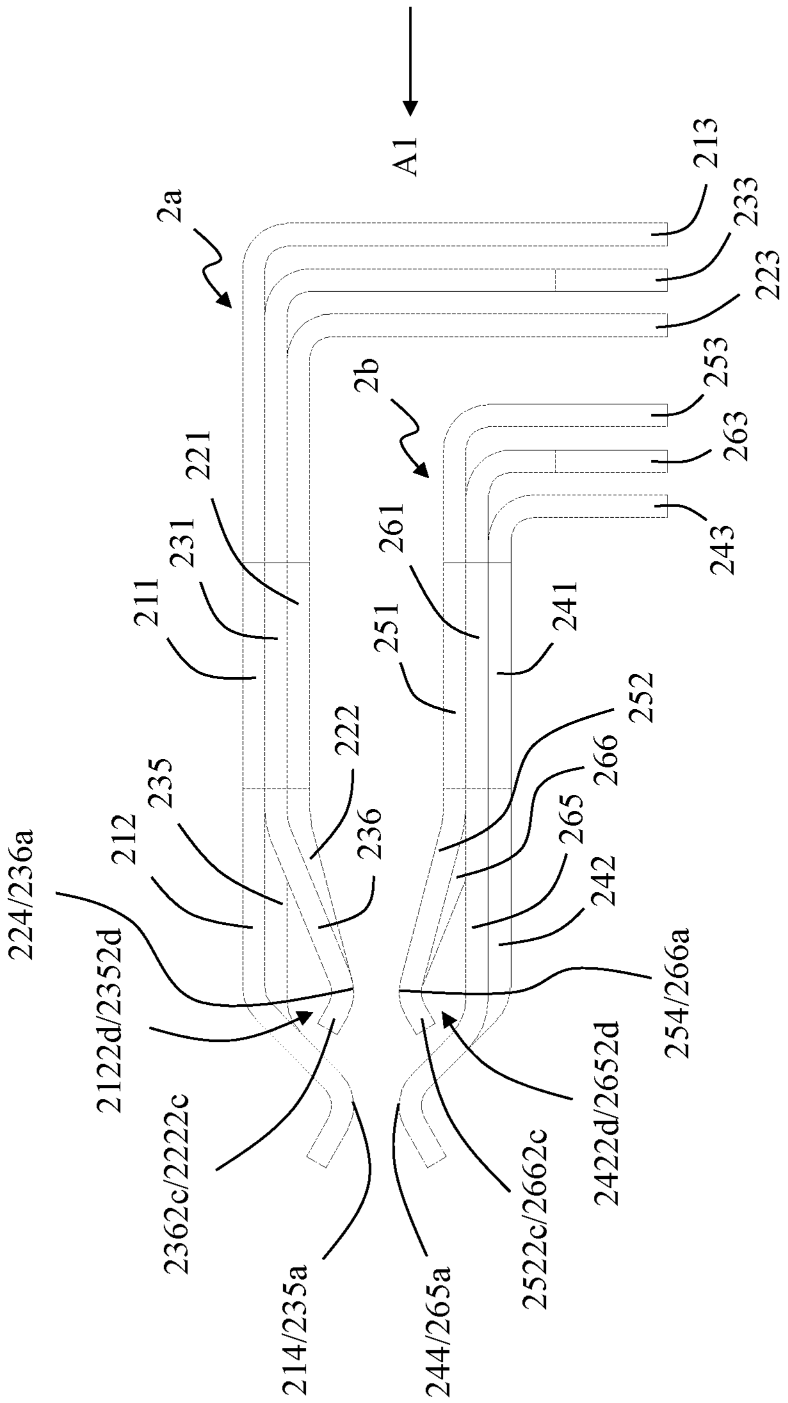
FIG. 5 is a right view of a plurality of power terminals in FIG. 3.
Figure 6:
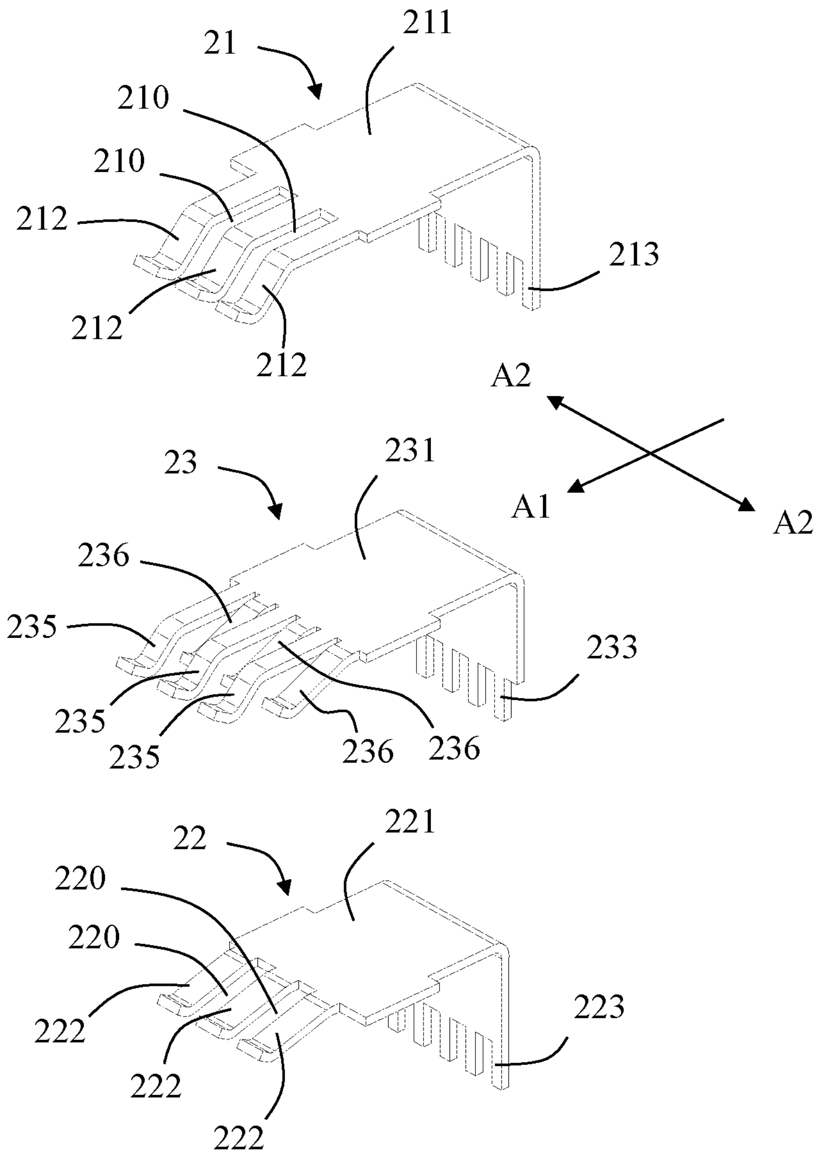
FIG. 6 is a perspective exploded view of a first group of power terminals in FIG. 3.
Figure 7:
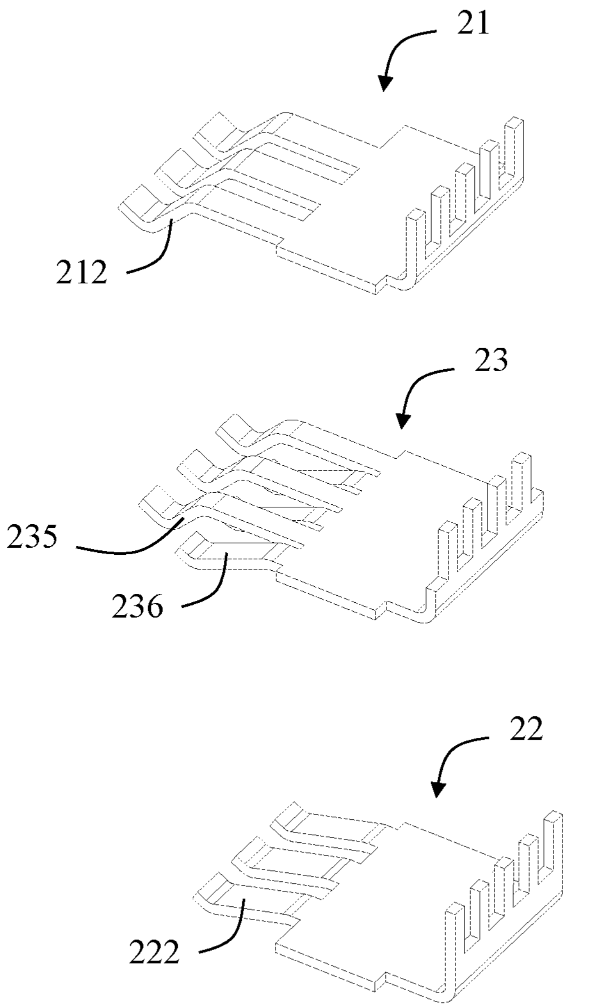
FIG. 7 is a perspective exploded view of FIG. 6 from another angle.
Figure 8:
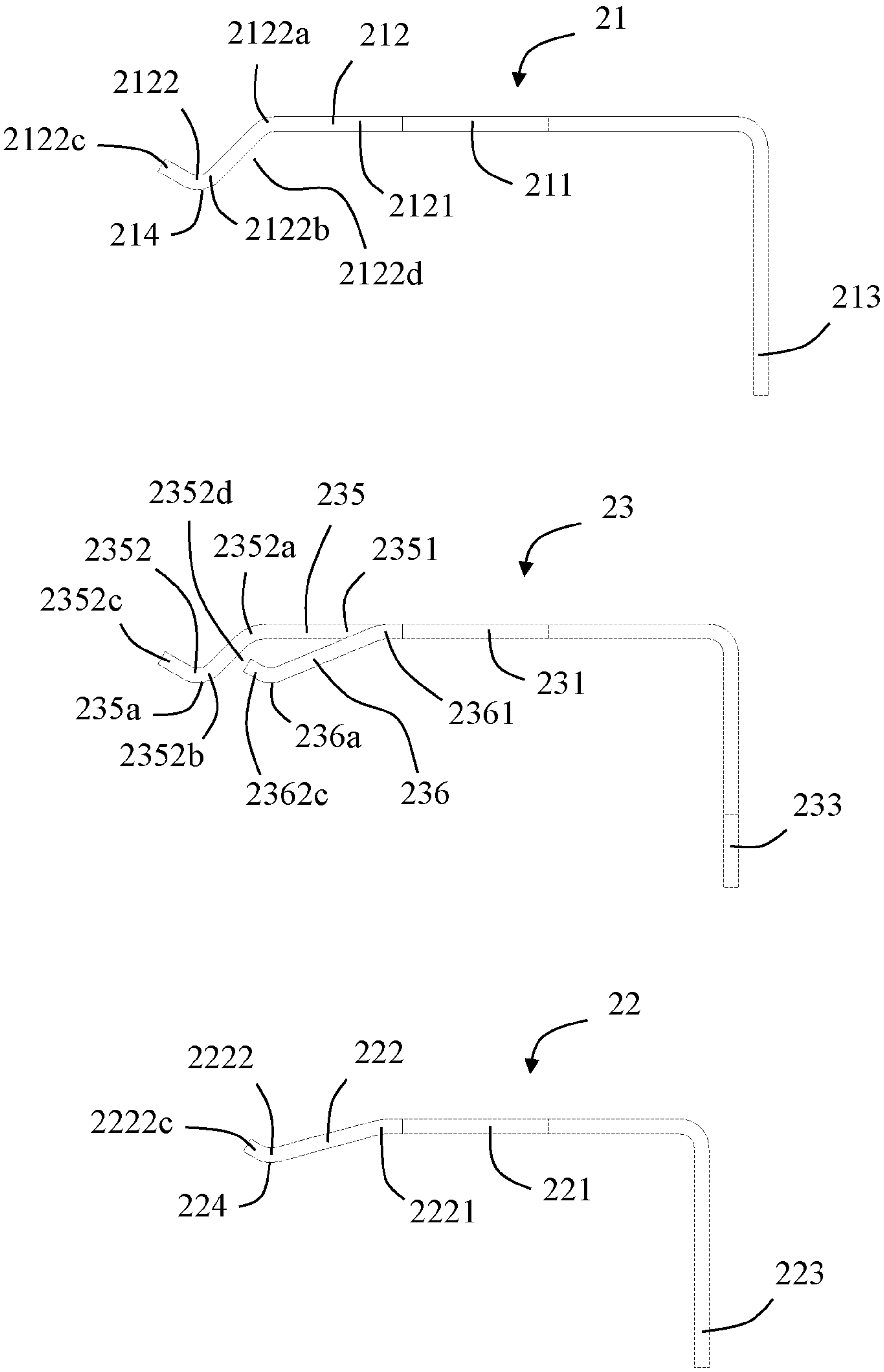
FIG. 8 is a right view of FIG. 6.

Referring to FIG. 5, in the embodiment illustrated in the present disclosure, the first mounting leg 213, the third mounting leg 233, the second mounting leg 223, the fifth mounting leg 253, the sixth mounting leg 263 and the fourth mounting leg 243 are disposed at intervals along the first direction A1.

Compared with the prior art, the plurality of power terminals 2 of the present disclosure include the third power terminal 23. The third power terminal 23 includes the first supplementary elastic arm 235 arranged side by side with the first elastic arm 212 and a second supplementary elastic arm 236 arranged side by side with the second elastic arm 222. Therefore, the first spacing slot 210 between the first elastic arms 212 and the second spacing slot 220 between the second elastic arms 222 are fully utilized, which increases the current-carrying area in contact with the mating power connector 200, has a higher current transmission capability, and reduces the heat generated by the power terminal when transmitting a large current. In addition, by providing the third mounting leg 233, the current-carrying area is further increased, and the resistance is reduced, thereby facilitating the transmission of a larger current.

Similarly, the plurality of power terminals 2 of the present disclosure include the sixth power terminal 26. The sixth power terminal 26 includes the fourth supplementary elastic arm 265 arranged side by side with the fourth elastic arm 242 and the fifth supplementary elastic arm 266 arranged side by side with the fifth elastic arm 252. Therefore, the fourth spacing slot 240 between the fourth elastic arms 242 and the fifth spacing slot 250 between the fifth elastic arms 252 are fully utilized, which increases the current-carrying area in contact with the mating power connector 200, has a higher current transmission capability, and reduces the heat generated by the power terminal when transmitting a large current. In addition, by providing the sixth mounting leg 263, the current-carrying area is further increased, and the resistance is reduced, thereby facilitating the transmission of a larger current.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A power connector, comprising:

an insulating body comprising a mating surface and a mating slot extending through the mating surface along a first direction; the mating slot being configured to at least partially receive a mating power connector; and a plurality of power terminals comprising a first power terminal, a second power terminal and a third power terminal;

wherein the first power terminal comprises a first fixing portion fixed to the insulating body and at least one first elastic arm extending from the first fixing portion; the first elastic arm comprises a first contact surface;

the second power terminal comprises a second fixing portion fixed to the insulating body and at least one second elastic arm extending from the second fixing portion; the second elastic arm comprises a second contact surface;

the third power terminal comprises a third fixing portion sandwiched between the first fixing portion and the second fixing portion, at least one first supplementary elastic arm extending from the third fixing portion, and at least one second supplementary elastic arm extending from the third fixing portion; the first supplementary elastic arm comprises a first supplementary contact surface; the second supplementary elastic arm comprises a second supplementary contact surface;

a length of the first elastic arm along the first direction is different from a length of the second elastic arm along the first direction, so that the first contact surface and the second contact surface are disposed at intervals along the first direction;

a length of the first supplementary elastic arm along the first direction is different from a length of the second supplementary elastic arm along the first direction, so that the first supplementary contact surface and the second supplementary contact surface are disposed at intervals along the first direction;

the first supplementary elastic arm is such extended to be disposed side by side with the first elastic arm along a second direction, so that the first contact surface and the first supplementary contact surface are located in a first row; the second direction is perpendicular to the first direction;

the second supplementary elastic arm is such extended to be arranged side by side with the second elastic arm along the second direction, so that the second contact surface and the second supplementary contact surface are located in a second row; the first row and the second row are parallel to each other.

2. The power connector according to claim 1, wherein a plurality of first elastic arms are provided on the first power terminal and are disposed at intervals along the second direction;

a plurality of the second elastic arms are provided on the second power terminal and are disposed at intervals along the second direction;

a plurality of first supplementary elastic arms are provided on the third power terminal and are disposed at intervals along the second direction;

a plurality of second supplementary elastic arms are provided on the third power terminal and are disposed at intervals along the second direction;

wherein the first elastic arms and the first supplementary elastic arms are alternately arranged along the second direction; and the second elastic arms and the second supplementary elastic arms are alternately arranged along the second direction.

3. The power connector according to claim 2, wherein the first supplementary elastic arms provided on the third power terminal and the second supplementary elastic arms provided on the third power terminal are alternately arranged along the second direction.

4. The power connector according to claim 2, wherein a number of the first elastic arms, a number of the second elastic arms, a number of the first supplementary elastic arms and a number of the second supplementary elastic arms are the same.

5. The power connector according to claim 4, wherein a width of each of the first elastic arms along the second direction is greater than a width of each of the first supplementary arms along the second direction; and a width of each of the second elastic arms along the second direction is greater than a width of each of the second supplementary elastic arms along the second direction.

6. The power connector according to claim 1, wherein the first contact surface, the first supplementary contact surface, the second contact surface and the second supplementary contact surface are flush with one another.

7. The power connector according to claim 1, wherein the plurality of power terminals comprise a fourth power terminal, a fifth power terminal and a sixth power terminal;

wherein the fourth power terminal comprises a fourth fixing portion fixed to the insulating body and at least one fourth elastic arm extending from the fourth fixing portion; the fourth elastic arm comprises a fourth contact surface;

the fifth power terminal comprises a fifth fixing portion fixed to the insulating body and at least one fifth elastic arm extending from the fifth fixing portion; the fifth elastic arm comprises a fifth contact surface;

the sixth power terminal comprises a sixth fixing portion sandwiched between the fourth fixing portion and the fifth fixing portion, at least one fourth supplementary elastic arm extending from the sixth fixing portion, and at least one fifth supplementary elastic arm extending from the sixth fixing portion; the fourth supplementary elastic arm comprises a fourth supplementary contact surface; the fifth supplementary elastic arm comprises a fifth supplementary contact surface;

wherein a length of the fourth elastic arm along the first direction is different from a length of the fifth elastic arm along the first direction, so that the fourth contact surface and the fifth contact surface are disposed at intervals along the first direction;

a length of the fourth supplementary elastic arm along the first direction is different from a length of the fifth supplementary elastic arm along the first direction, so that the fourth supplementary contact surface and the fifth supplementary contact surface are disposed at intervals along the first direction;

the fourth supplementary elastic arm is such extended to be arranged side by side with the fourth elastic arm along the second direction, so that the fourth contact surface and the fourth supplementary contact surface are located in a third row;

the fifth supplementary elastic arm is such extended to be arranged side by side with the fifth elastic arm along the second direction, so that the fifth contact surface and the fifth supplementary contact surface are located in a fourth row; the third row and the fourth row are parallel to each other.

8. The power connector according to claim 7, wherein a plurality of fourth elastic arms are provided on the fourth power terminal and are disposed at intervals along the second direction;

a plurality of fifth elastic arms are provided on the fifth power terminal and are disposed at intervals along the second direction;

a plurality of fourth supplementary elastic arms are provided on the sixth power terminal and are disposed at intervals along the second direction;

a plurality of fifth supplementary elastic arms are provided on the sixth power terminal and are disposed at intervals along the second direction;

wherein the fourth elastic arms and the fourth supplementary elastic arms are alternately arranged along the second direction; and the fifth elastic arms and the fifth supplementary elastic arms are alternately arranged along the second direction.

9. The power connector according to claim 8, wherein the fourth supplementary elastic arms provided on the sixth power terminal and the fifth supplementary elastic arms provided on the sixth power terminal are alternately arranged along the second direction.

10. The power connector according to claim 8, wherein a number of the fourth elastic arms, a number of the fifth elastic arms, a number of the fourth supplementary elastic arms and a number of the fifth supplementary elastic arms are the same.

11. The power connector according to claim 10, wherein a width of each of the fourth elastic arms along the second direction is greater than a width of each of the fourth supplementary arms along the second direction;

a width of each of the fifth elastic arms along the second direction is greater than a width of each of the fifth supplementary elastic arms along the second direction.

12. The power connector according to claim 7, wherein the fourth contact surface, the fourth supplementary contact surface, the fifth contact surface and the fifth supplementary contact surface are flush with one another;

the first contact surface, the first supplementary contact surface, the second contact surface and the second supplementary contact surface are located on one side of the mating slot; and the fourth contact surface, the fourth supplementary contact surface, the fifth contact surface and the fifth supplementary contact surface are located on another side of the mating slot.

13. The power connector according to claim 7, wherein the first power terminal comprises a first mounting leg bent from the first fixing portion;

the second power terminal comprises a second mounting leg bent from the second fixing portion;

the third power terminal comprises a third mounting leg bent from the third fixing portion;

the fourth power terminal comprises a fourth mounting leg bent from the fourth fixing portion;

the fifth power terminal comprises a fifth mounting leg bent from the fifth fixing portion;

the sixth power terminal comprises a sixth mounting leg bent from the sixth fixing portion;

wherein the first mounting leg, the third mounting leg, the second mounting leg, the fifth mounting leg, the sixth mounting leg and the fourth mounting leg are disposed at intervals in sequence along the first direction.

14. A power connector, comprising:

an insulating body comprising a mating surface and a mating slot extending through the mating surface along a first direction; the mating slot being configured to at least partially receive a mating power connector; and a plurality of power terminals comprising a first power terminal, a second power terminal and a third power terminal;

wherein the first power terminal comprises a first fixing portion and at least one first elastic arm extending from the first fixing portion; the first elastic arm comprises a first contact surface;

the second power terminal comprises a second fixing portion and at least one second elastic arm extending from the second fixing portion; the second elastic arm comprises a second contact surface;

the third power terminal comprises a third fixing portion sandwiched between the first fixing portion and the second fixing portion, a first supplementary elastic arm integrally extending from the third fixing portion, and a second supplementary elastic arm integrally extending from the third fixing portion; the first supplementary elastic arm comprises a first supplementary contact surface; the second supplementary elastic arm comprises a second supplementary contact surface;

the first contact surface and the second contact surface are disposed at intervals along the first direction;

the first supplementary contact surface and the second supplementary contact surface are disposed at intervals along the first direction;

the first supplementary elastic arm is such extended to be disposed side by side with the first elastic arm along a second direction, so that the first contact surface and the first supplementary contact surface are located in a first row; the second direction is perpendicular to the first direction;

the second supplementary elastic arm is such extended to be arranged side by side with the second elastic arm along the second direction, so that the second contact surface and the second supplementary contact surface are located in a second row; the first row and the second row are parallel to each other.

15. The power connector according to claim 14, wherein a width of the first elastic arm along the second direction is greater than a width of the first supplementary arm along the second direction; and a width of the second elastic arm along the second direction is greater than a width of the second supplementary elastic arm along the second direction.

16. The power connector according to claim 14, wherein the first contact surface, the first supplementary contact surface, the second contact surface and the second supplementary contact surface are flush with one another.

17. The power connector according to claim 14, wherein the first power terminal comprises a first mounting leg bent from the first fixing portion;

the second power terminal comprises a second mounting leg bent from the second fixing portion;

the third power terminal comprises a third mounting leg bent from the third fixing portion;

wherein the first mounting leg, the third mounting leg, the second mounting leg are disposed at intervals in sequence along the first direction.

18. The power connector according to claim 14, wherein the plurality of power terminals comprise a fourth power terminal, a fifth power terminal and a sixth power terminal;

wherein the fourth power terminal comprises a fourth fixing portion and at least one fourth elastic arm extending from the fourth fixing portion; the fourth elastic arm comprises a fourth contact surface;

the fifth power terminal comprises a fifth fixing portion and at least one fifth elastic arm extending from the fifth fixing portion; the fifth elastic arm comprises a fifth contact surface;

the sixth power terminal comprises a sixth fixing portion sandwiched between the fourth fixing portion and the fifth fixing portion, a fourth supplementary elastic arm integrally extending from the sixth fixing portion, and a fifth supplementary elastic arm integrally extending from the sixth fixing portion; the fourth supplementary elastic arm comprises a fourth supplementary contact surface; the fifth supplementary elastic arm comprises a fifth supplementary contact surface;

the fourth contact surface and the fifth contact surface are disposed at intervals along the first direction;

the fourth supplementary contact surface and the fifth supplementary contact surface are disposed at intervals along the first direction;

the fourth supplementary elastic arm is such extended to be arranged side by side with the fourth elastic arm along the second direction, so that the fourth contact surface and the fourth supplementary contact surface are located in a third row;

the fifth supplementary elastic arm is such extended to be arranged side by side with the fifth elastic arm along the second direction, so that the fifth contact surface and the fifth supplementary contact surface are located in a fourth row; the third row and the fourth row are parallel to each other.

19. The power connector according to claim 18, wherein the fourth power terminal comprises a fourth mounting leg bent from the fourth fixing portion;

the fifth power terminal comprises a fifth mounting leg bent from the fifth fixing portion;

the sixth power terminal comprises a sixth mounting leg bent from the sixth fixing portion;

wherein the fifth mounting leg, the sixth mounting leg and the fourth mounting leg are disposed at intervals in sequence along the first direction.

20. The power connector according to claim 18, wherein the fourth contact surface, the fourth supplementary contact surface, the fifth contact surface and the fifth supplementary contact surface are flush with one another;

the first contact surface, the first supplementary contact surface, the second contact surface and the second supplementary contact surface are located on one side of the mating slot; and the fourth contact surface, the fourth supplementary contact surface, the fifth contact surface and the fifth supplementary contact surface are located on another side of the mating slot.

* * * * *